United States Patent
Oshitani et al.

(10) Patent No.: US 6,729,157 B2
(45) Date of Patent: May 4, 2004

(54) AIR CONDITIONER WITH EJECTOR CYCLE SYSTEM

(75) Inventors: Hiroshi Oshitani, Toyota (JP); Hirotsugu Takeuchi, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/335,371

(22) Filed: Dec. 31, 2002

(65) Prior Publication Data
US 2003/0131611 A1 Jul. 17, 2003

(30) Foreign Application Priority Data
Jan. 15, 2002 (JP) ....................... 2002-005844

(51) Int. Cl.[7] .............................. F25B 1/06; F25B 13/00
(52) U.S. Cl. ........................ 62/500; 62/324.2
(58) Field of Search ................... 62/500, 116, 324.2, 62/526

(56) References Cited

U.S. PATENT DOCUMENTS

| | | | | | |
|---|---|---|---|---|---|
| 1,871,244 A | * | 8/1932 | Steuart | .................. | 165/62 |
| 2,195,604 A | * | 4/1940 | Taylor | .................. | 62/120 |
| 3,300,995 A | * | 1/1967 | McGrath | .................. | 62/116 |
| 3,427,817 A | * | 2/1969 | Rietdijk | .................. | 62/113 |
| 3,447,339 A | * | 6/1969 | Rietdijk | .................. | 62/500 |
| 4,218,891 A | * | 8/1980 | Schwartzman | .................. | 62/116 |
| 4,321,801 A | * | 3/1982 | Collard, Jr. | .................. | 62/238.4 |
| 5,444,987 A | * | 8/1995 | Alsenz | .................. | 62/116 |
| 5,553,457 A | * | 9/1996 | Reznikov | .................. | 62/81 |
| 6,550,265 B2 | * | 4/2003 | Takeuchi et al. | .................. | 62/324.2 |

FOREIGN PATENT DOCUMENTS

| | | | |
|---|---|---|---|
| JP | 5-149652 | * | 6/1993 |
| JP | 6-206438 | * | 7/1994 |
| JP | 11-139154 | * | 5/1999 |

* cited by examiner

*Primary Examiner*—William C. Doerrler
(74) *Attorney, Agent, or Firm*—Harness, Dickey & Pierce, PLC

(57) ABSTRACT

An air conditioner with an ejector includes first and second interior heat exchangers for performing heat-exchange between refrigerant and air to be blown into a compartment. The second interior heat exchanger is disposed at a downstream air side of the first interior heat exchanger, and a decompression valve for decompressing refrigerant in a dehumidifying-heating operation is disposed in a refrigerant passage connecting the first and second interior heat exchangers. In a cooling operation, the first and second interior heat exchanger are used as evaporators. On the other hand, in the dehumidifying-heating operation, refrigerant decompressed in the decompression valve is evaporated in the first interior heat exchanger while bypassing a nozzle of the ejector, and refrigerant is radiated in the second interior heat exchanger.

12 Claims, 8 Drawing Sheets

AIR CONDITIONER WITH EJECTOR CYCLE SYSTEM

CROSS-REFERENCE TO RELATED APPLICATION

This application is related to Japanese Patent Application No. 2002-5844 filed on Jan. 15, 2002, the contents of which are hereby incorporated by reference.

BACKGROUND OF THE INVENTION

1. Field of the Invention

The present invention relates an air conditioner with an ejector cycle system having an ejector.

2. Description of Related Art

In a conventional ejector cycle system described in JP-A-5-149652, an ejector increases a pressure of refrigerant to be sucked into a compressor by converting an expansion energy to a pressure energy. Further, an evaporator is provided in the ejector cycle system so that air can be cooled by the evaporator. Recently, a dehumidifying and heating function for dehumidifying a compartment while preventing an excessive temperature decrease is required in an air conditioner. However, in the conventional system, there is not described regarding the dehumidifying and heating function.

SUMMARY OF THE INVENTION

In view of the foregoing problems, it is an object of the present invention to provide an air conditioner with an ejector cycle system, which has the dehumidifying and heating function.

According to the present invention, an air conditioner includes a compressor for sucking and compressing refrigerant, an exterior heat exchanger for performing heat-exchange between the refrigerant and air outside a compartment, a first interior heat exchanger for performing heat-exchange between the refrigerant and air to be blown into the compartment, a second interior heat exchanger for performing heat-exchange between the refrigerant and air to be blown into the compartment, an ejector, a gas-liquid separator for separating refrigerant into gas refrigerant and liquid refrigerant, and a switching unit for switching one of at least a cooling operation for cooling the compartment and a dehumidifying-heating operation for dehumidifying the compartment while restricting a temperature decrease in the compartment. The second interior heat exchanger is disposed at a downstream air side of the first interior heat exchanger. In the cooling operation, refrigerant in the first and second interior heat exchangers is evaporated, and refrigerant in the exterior heat exchanger is radiated. Therefore, the cooling capacity of the compartment can be improved. On the other hand, in the dehumidifying-heating operation, refrigerant is evaporated in the first interior heat exchanger while refrigerant in the second interior heat exchanger is radiated. Accordingly, in the air conditioner, the dehumidifying and heating function can be obtained. Thus, the compartment can be dehumidified while it can prevent temperature of the compartment from being excessively decreased.

Preferably, a decompression unit for decompressing refrigerant at least in the dehumidifying-heating operation is disposed in a refrigerant passage connecting the first interior heat exchanger and the second interior heat exchanger. Therefore, the dehumidifying operating of the compartment can be readily performed in the air conditioner using the decompression unit. Here, the first interior heat exchanger and the second interior heat exchanger can be arranged in series, relative to a refrigerant flow. In this case, in the cooling operation, refrigerant discharged from the compressor flows through the exterior heat exchanger, the nozzle of the ejector and the gas-liquid separator in this order, while liquid refrigerant in the gas-liquid separator flows through the first and second interior heat exchangers, the ejector and the gas-liquid separator in this order. On the other hand, in the dehumidifying-heating operation, refrigerant discharged from the compressor flows through the exterior heat exchanger, the second interior heat exchanger, the decompression unit, the first interior heat exchanger and the gas-liquid separator in this order while bypassing the ejector.

On the other hand, the first interior heat exchanger and the second interior heat exchanger can be arranged in parallel relative to a refrigerant flow, at least in the cooling operation. In this case, at least in the dehumidifying-heating operation, a part of high-pressure refrigerant discharged from the compressor, before being decompressed, is introduced into the second interior heat exchanger, and flows into the first interior heat exchanger after being decompressed in the decompression unit, while the other part of the high-pressure refrigerant is introduced into the nozzle of the ejector. In this case, the dehumidifying and heating function of the compartment can be obtained while power consumed in the compressor can be reduced.

Further, the switching unit can be disposed to switch one of the cooling operation, the dehumidifying-heating operation, and a heating operation for heating the compartment. In this case, in the heating operation, refrigerant is evaporated in the exterior heat exchanger while refrigerant is radiated in both the first and second interior heat exchangers. Specifically, in the heating operation, refrigerant discharged from the compressor flows through the first and second interior heat exchangers, the nozzle of the ejector and the gas-liquid separator, while liquid refrigerant in the gas-liquid separator flows through the exterior heat exchanger, the ejector and the gas-liquid separator in this order. Accordingly, the cooling operation, the dehumidifying-heating operation and the heating operation can be selectively switched in the air conditioner.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

A first preferred embodiment of the present invention will be now described with reference to FIGS. 1–3. In the first embodiment, the present invention can be typically applied to an air conditioner arranged for a compartment such as a house.

Figure 1:
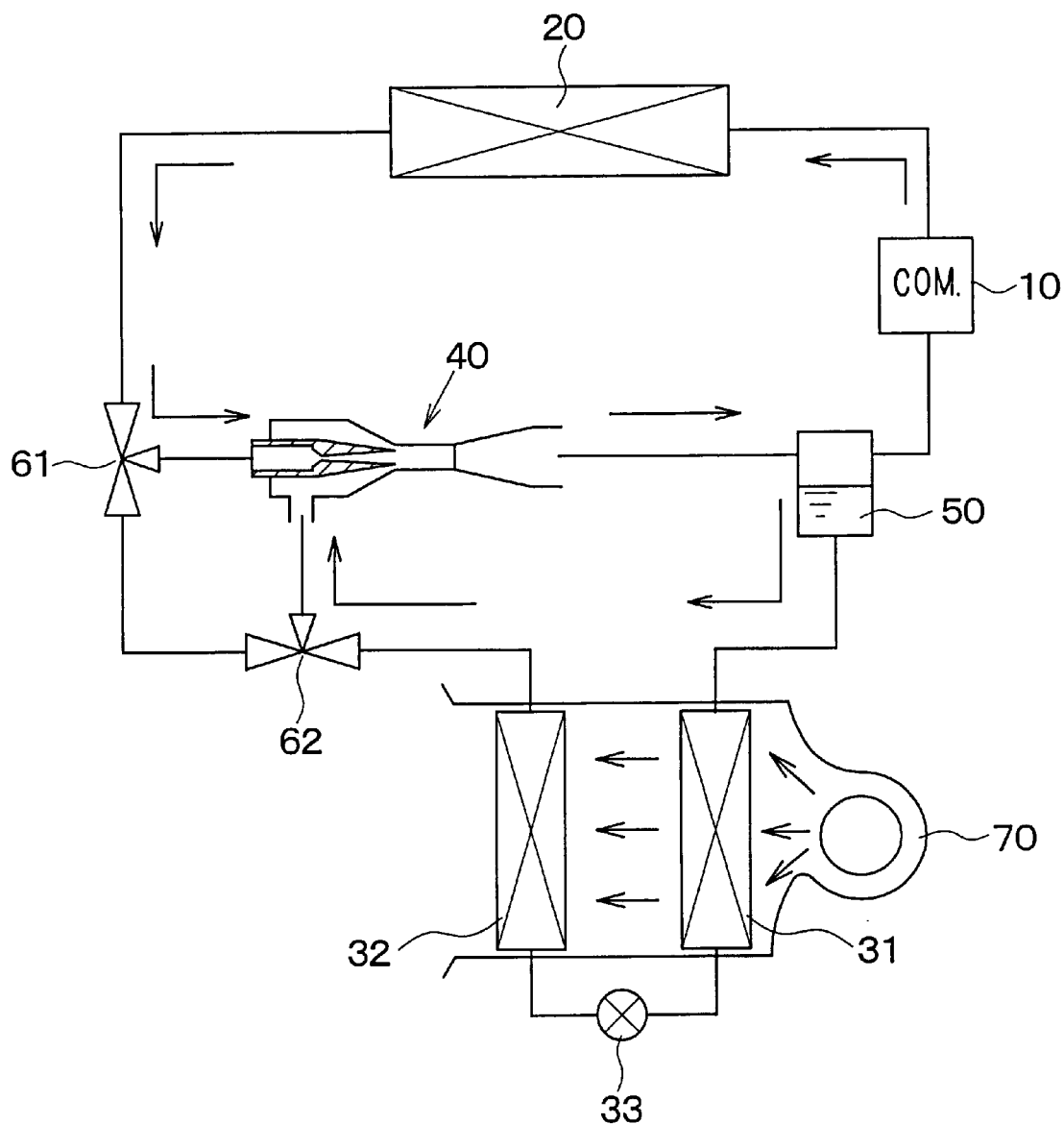
FIG. 1 is a schematic diagram showing a refrigerant flow in a refrigerant cycle of an air conditioner, in a cooling operation, according to a first preferred embodiment of the present invention.

A compressor 10 shown in FIG. 1 is electrically driven to suck and compress refrigerant. In an exterior heat exchanger 20, refrigerant in an ejector cycle system (refrigerant cycle) is heat-exchanged with air (outside air) outside a compartment. A first interior heat exchanger 31 and a second interior heat exchanger 32 are disposed so that refrigerant in the ejector cycle system is heat-exchanged with air to be blown into a compartment. The first interior heat exchanger 31 and the second interior heat exchanger 32 are disposed in an air conditioning case defining an air passage through which air flows into the compartment. The first interior heat exchanger 31 is disposed at an upstream air side of the second interior heat exchanger 32 in the air conditioning case. In addition, the first interior heat exchanger 31 and the second interior heat exchanger 32 are disposed in series relative to a refrigerant flow. A decompression valve 33, for decompressing refrigerant in a dehumidifying-heating operation, is provided in a refrigerant passage connecting the first interior heat exchanger 31 and the second interior heat exchanger 32.

An ejector 40 decompresses and expands refrigerant at a high pressure side in the ejector cycle system so that gas refrigerant evaporated at a low pressure side is sucked therein, and converts an expansion energy to the pressure energy to increase a pressure of refrigerant to be sucked into the compressor 10.

Figure 2:
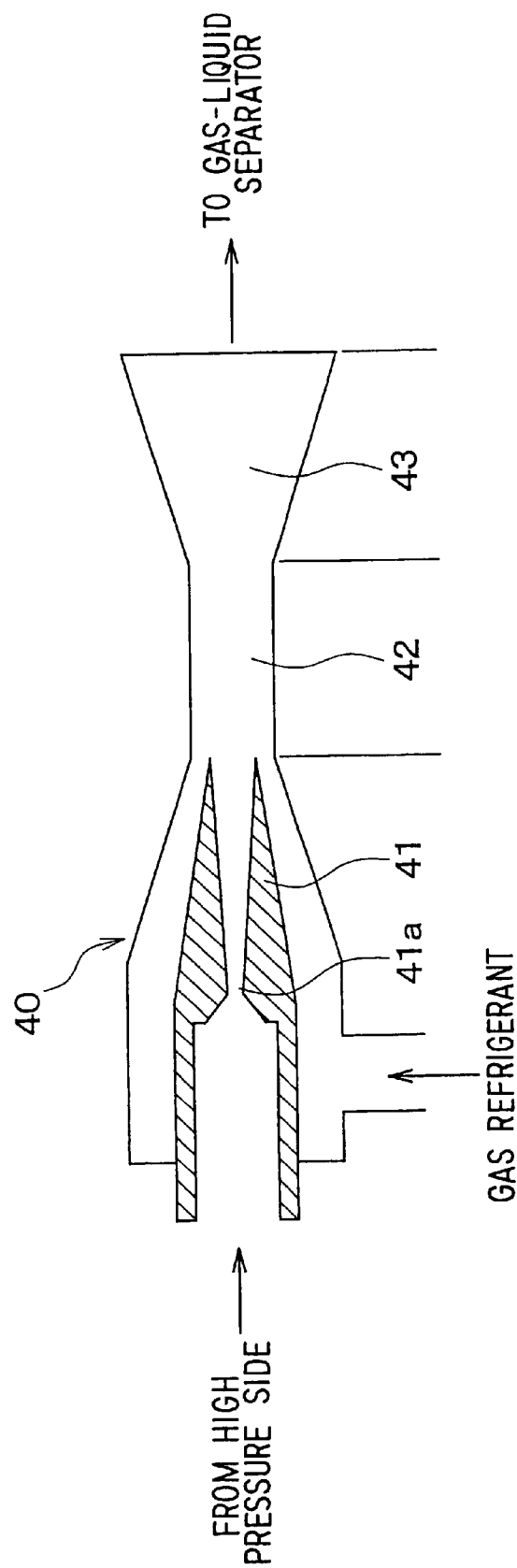
FIG. 2 is an enlarged schematic diagram showing an ejector used in the refrigerant cycle according to the first embodiment.
Figure 3:
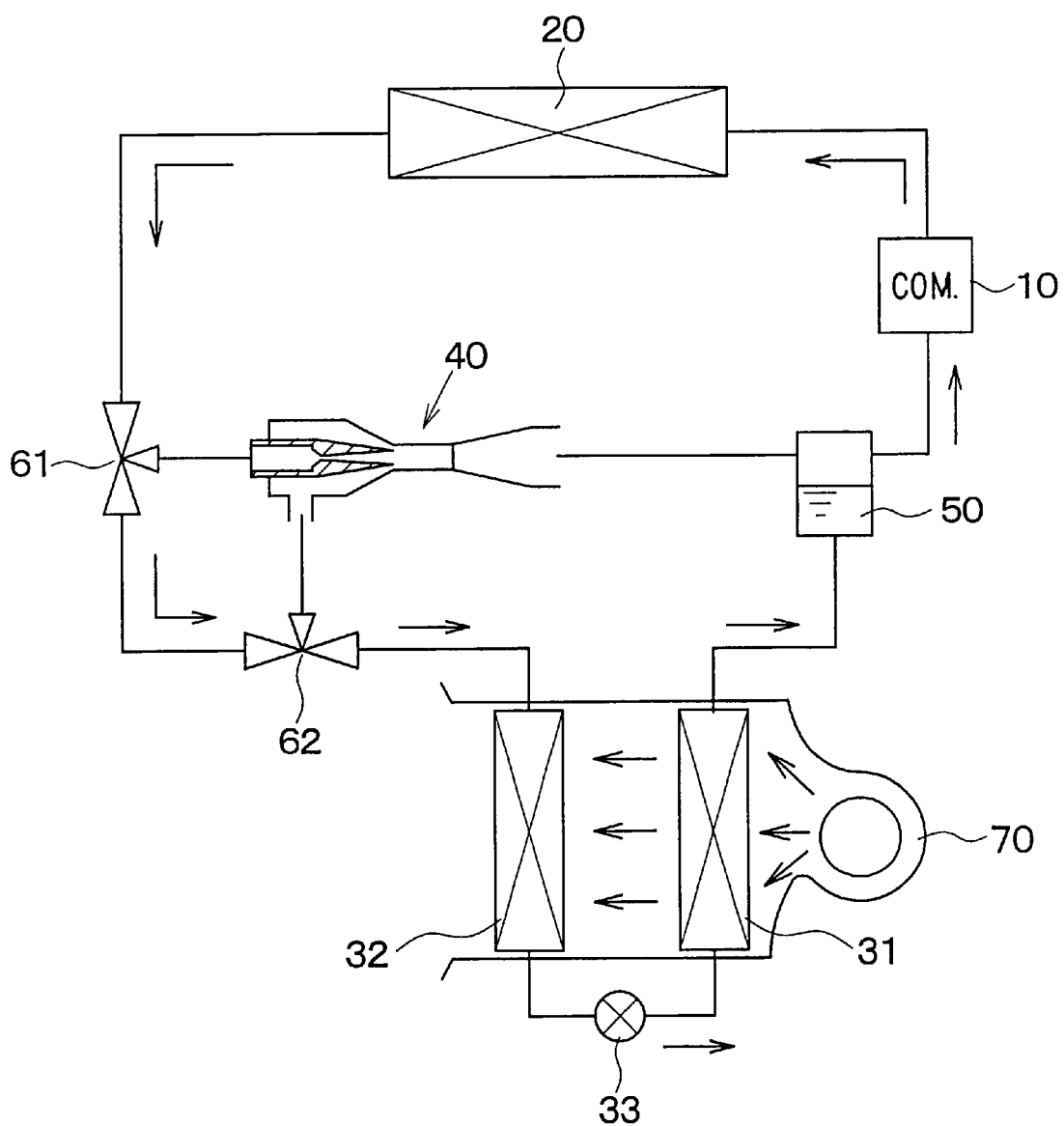
FIG. 3 is a schematic diagram showing a refrigerant flow of the refrigerant cycle of the air conditioner in a dehumidifying-heating operation, according to the first embodiment.

As shown in FIG. 2, the ejector 40 includes a nozzle 41, a mixing portion 42 and a diffuser 43. The nozzle 41 decompresses and expands the refrigerant at the high pressure side by converting a pressure energy (pressure head) of the refrigerant to a speed energy (speed head) thereof. In the mixing portion 42, the refrigerant evaporated at the low pressure side is sucked by high-speed refrigerant jetted from the nozzle 41. In the diffuser 43, the speed energy of refrigerant is converted to the pressure energy so that the pressure of refrigerant to be sucked into the compressor 10 is increased, while the refrigerant jetted from the nozzle 41 and the refrigerant sucked into the mixing portion 42 are mixed.

Here, the refrigerant pressure from the ejector 40 is increased not only in the diffuser 43, but also in the mixing portion 42 when the refrigerant, evaporated at the low pressure side, is sucked. Therefore, in the ejector 40, a pressure-increasing portion is constructed by the mixing portion 42 and the diffuser 43. In the first embodiment, a cross-sectional area of the mixing portion 42 is made constant until the diffuser 43. However, the mixing portion 42 may be tapered so that the cross-sectional area becomes larger toward the diffuser 43. The nozzle 41 has a throttle portion 41a at which the passage sectional area is reduced in maximum.

As shown in FIG. 1, refrigerant from the ejector 40 flows into a gas-liquid separator 50, to be separated into gas refrigerant and liquid refrigerant in the gas-liquid separator 50. In a cooling operation of the air conditioner, the gas refrigerant separated in the gas-liquid separator 50 is sucked into the compressor 10, and the separated liquid refrigerant flows toward the first and second interior heat exchangers 31, 32.

Three-way valves 61, 62 are provided for switching the refrigerant flow in the refrigerant cycle so that one of at least the cooling operation and the dehumidifying-heating operation is switched. A blower 70 is disposed to blow air into the compartment through the air conditioning case. In the first embodiment, the three-way valves 61, 62, the compressor 10, the decompression valve 33 and the blower 70 are controlled by en electronic control unit (ECU).

Next, operation of the air conditioner with the ejector cycle system will be now described.

(1) COOLING OPERATION (GENERAL OPERATION)

The general operation of the air conditioner is a cooling operation for cooling air to be blown into the compartment, or a dehumidifying-cooling operation for dehumidifying the compartment by cooling air to be blown into the compartment. In the cooling operation, the decompression valve 33 is fully opened so that refrigerant is not decompressed in the decompression valve 33. Further, the compressor 10 and the blower 70 are operated, and the three-way valves 61, 62 are operated so that refrigerant from the condenser 20 flows into the nozzle 41 of the ejector 40 and refrigerant from the first and second interior heat exchangers 31, 32 is sucked into the mixing portion 42 of the ejector 40. Accordingly, high-pressure refrigerant from the compressor 10 is heat exchanged with outside air in the condenser 20 to be cooled, and flows into the nozzle 41 of the ejector 40 to be decompressed and expanded. Refrigerant from the first and second interior heat exchangers 31, 32 are sucked into the mixing portion 42 of the ejector 40 to be mixed with refrigerant from the nozzle 41. The dynamical pressure of the mixed refrigerant becomes the static pressure thereof, so that the pressure of the mixed refrigerant is increased in the diffuser 43. Refrigerant from the ejector 40 flows into the gas-liquid separator 50.

On the other hand, because refrigerant in the first and second interior heat exchangers 31, 32 is sucked into the ejector 40, liquid refrigerant in the gas-liquid separator 50 flows into the first and second interior heat exchangers 31, 32. Liquid refrigerant flowing into the first and second interior heat exchangers 31, 32 from the gas-liquid separator 50 is evaporated in the first and second interior heat exchangers 31, 32 by absorbing heat from air passing through the first and second interior heat exchangers 31, 32, so that air blown into the compartment is cooled and dehumidified. In the first embodiment, the cooling capacity generated in the first and second interior heat exchangers 31, 32 can be controlled by the ECU by controlling a rotation speed of the compressor 10 and an air-blowing amount of the blower 70.

(2) DEHUMIDIFYING-HEATING OPERATION

In the dehumidifying-heating operation, air to be blown into the compartment is cooled and dehumidified first in the first interior heat exchanger 31, and the dehumidified air is heated in the second interior heat exchanger 32. Therefore, in the dehumidifying-heating operation, it can prevent the temperature of air blown into the compartment from being excessively reduced.

Specifically, the opening degree of the decompression valve 33 for dehumidifying is reduced so that refrigerant is decompressed in the decompression valve 33. On the other hand, the three-way valves 61, 62 are operated so that refrigerant bypasses the ejector 40, while the compressor 10 and the blower 70 are operated. Accordingly, refrigerant discharged from the compressor 10 is cooled and condensed in the exterior heat exchanger 20 and the second interior heat exchanger 32, and is decompressed in the decompression valve 33. Gas-liquid two-phase refrigerant decompressed in the decompression valve 33 flows into the first interior heat exchanger 31. Liquid refrigerant flowing into the first interior heat exchanger 31 is evaporated by absorbing heat from air passing through the first interior heat exchanger 31.

In the dehumidifying-heating operation, air cooled and dehumidified in the first interior heat exchanger 31 is heated in the second interior heat exchanger 32. Therefore, the compartment can be effectively dehumidified while it can prevent air to be blown into the compartment from being excessively cooled. Even in the dehumidifying-heating operation, the rotation speed of the compressor 10, the opening degree of the decompression valve 33 and the air blowing amount of the blower 70 are controlled by the electronic control unit, so that the temperature of air blown into the compartment can be suitably controlled.

A second preferred embodiment of the present invention will be now described with reference to FIGS. 4 and 5. In the above-described first embodiment, the first interior heat exchanger 31 and the second interior heat exchanger 32 are disposed in series relative to the refrigerant flow. In the second embodiment, the first interior heat exchanger 31 and the second interior heat exchanger 32 are disposed in parallel relative to the refrigerant flow in the cooling operation, and the decompression valve 33 is provided in a refrigerant passage connecting the first and second interior heat exchangers 31, 32. In the second embodiment, the three-way valve 61 described in the first embodiment is omitted.

Next, the operation of the air conditioner with the ejector cycle system, according to the second embodiment, will be now described.

(1) COOLING OPERATION (GENERAL OPERATION)

Figure 4:
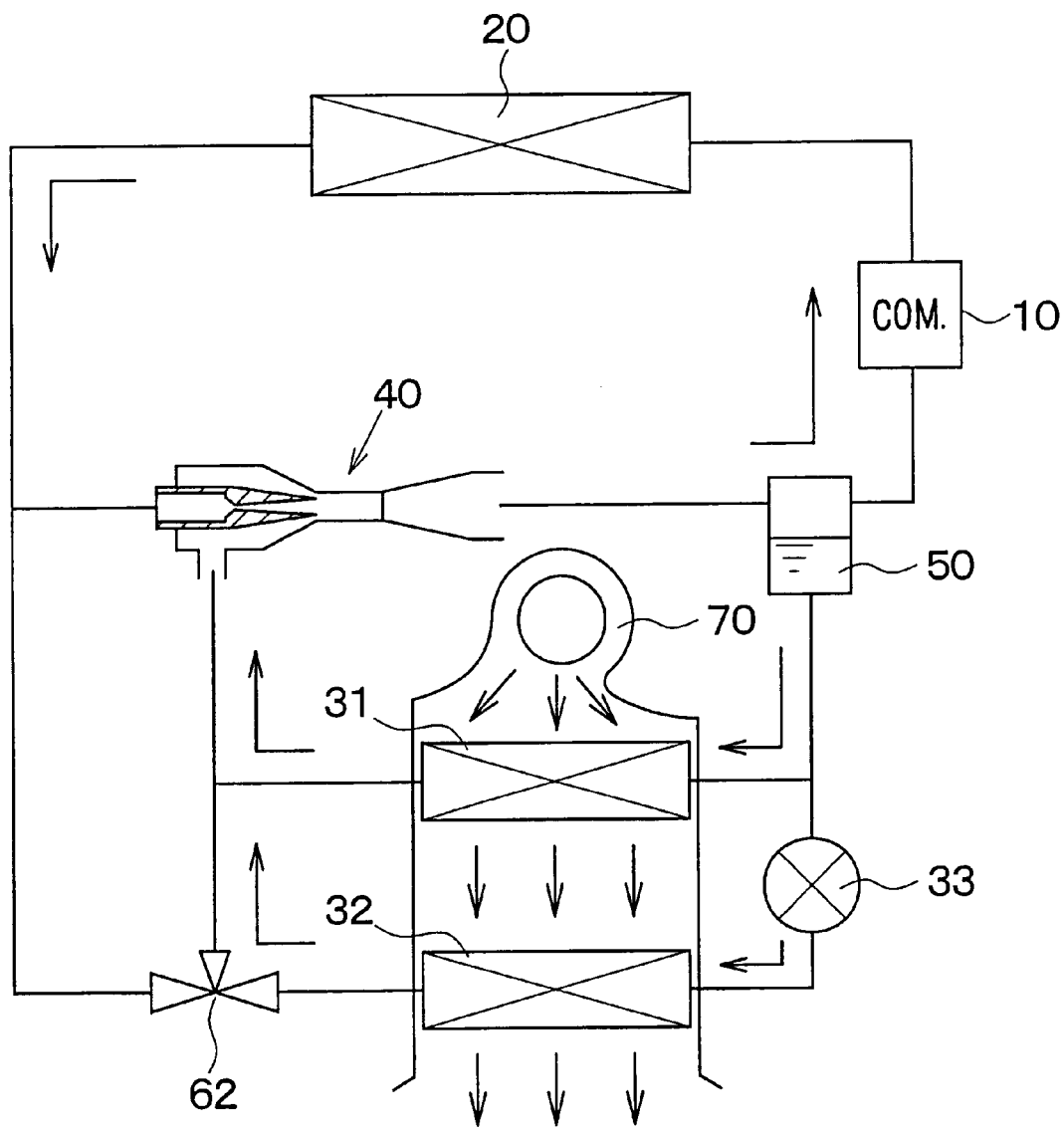
FIG. 4 is a schematic diagram showing a refrigerant flow in a refrigerant cycle of an air conditioner, in a cooling operation, according to a second preferred embodiment of the present invention.
Figure 5:
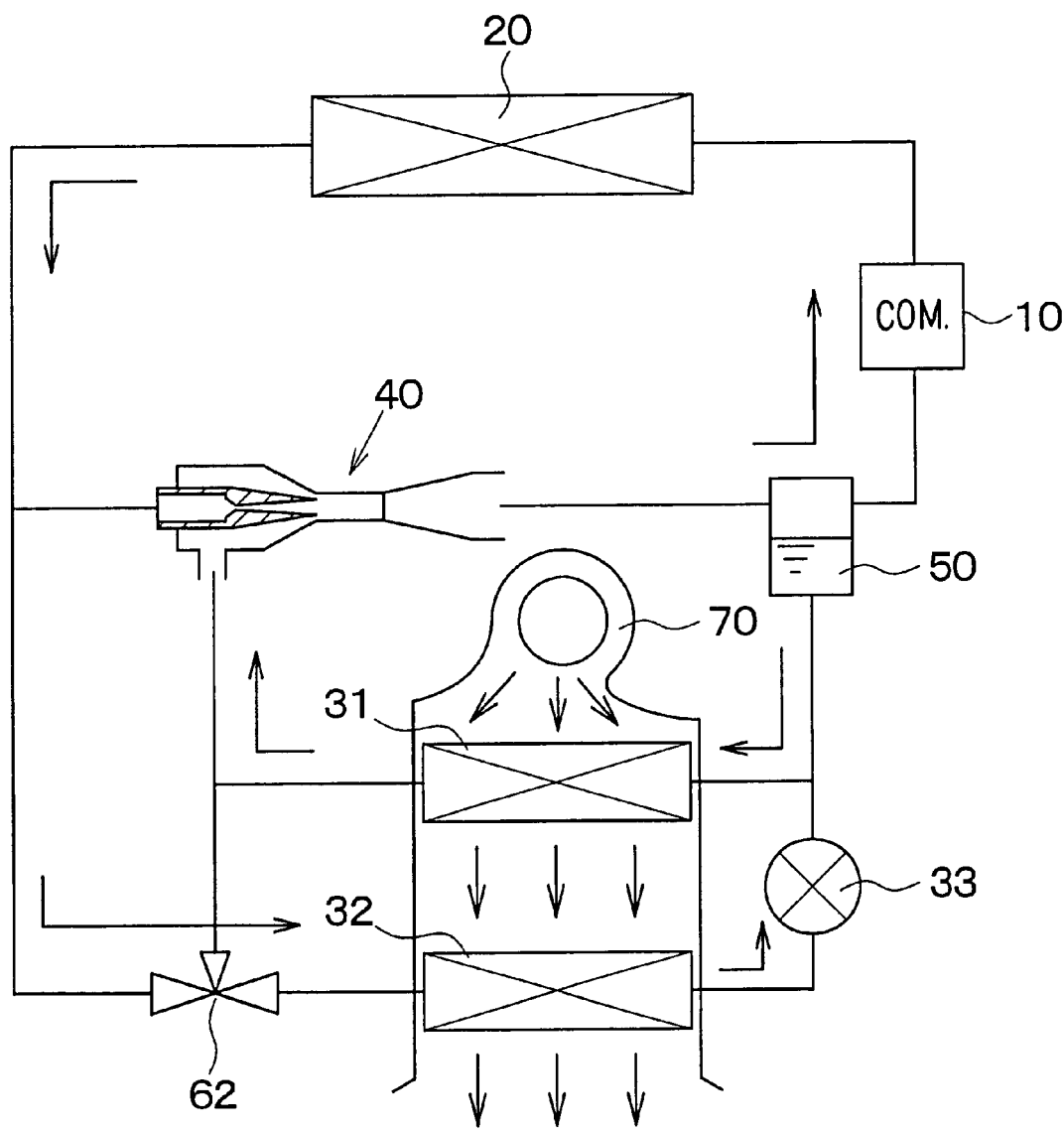
FIG. 5 is a schematic diagram showing a refrigerant flow of the refrigerant cycle of the air conditioner in a dehumidifying-heating operation, according to the second embodiment.

In the cooling operation, as shown in FIG. 4, the decompression valve 33 for dehumidifying is fully opened so that refrigerant is not decompressed in the decompression valve 33. Further, the three-way valve 62 is operated, so that refrigerant from the exterior heat exchanger 20 flows into the nozzle 41 of the ejector 40 while refrigerant from the first and second interior heat exchangers 31, 32 is sucked into the mixing portion 42 of the ejector 40. In the cooling operation, the compressor 10 and the blower 70 are operated in this state.

Accordingly, gas refrigerant from the gas-liquid separator 50 is sucked into the compressor 10, and compressed refrigerant in the compressor 10 is discharged to the exterior heat exchanger 20. Refrigerant cooled and condensed in the exterior heat exchanger 20 is decompressed and expanded in the nozzle 41 of the ejector 40 so that gas refrigerant in the first and second interior heat exchangers 31, 32 is sucked into the ejector 40. Refrigerant sucked from the first and second interior heat exchangers 31, 32 and refrigerant jetted from the nozzle 41 are mixed in the mixing portion 42, and the pressure of the mixed refrigerant is increased in the diffuser 43. Refrigerant from the diffuser 43 of the ejector 40 flows into the gas-liquid separator 50.

On the other hand, because refrigerant in the first and second interior heat exchangers 31, 32 is sucked into the ejector 40, liquid refrigerant in the gas-liquid separator 50 flows into the first and second interior heat exchangers 31, 32. Liquid refrigerant flowing into the first and second interior heat exchangers 31, 32 from the gas-liquid separator 50 is evaporated in the first and second interior heat exchangers 31, 32 by absorbing heat from air passing through the first and second interior heat exchangers 31, 32, so that air blown into the compartment is cooled and dehumidified. In the second embodiment, the rotation speed of the compressor 10 and the air-blowing amount of the blower 70 are controlled so that the cooling capacity generated in the first and second interior heat exchangers 31, 32 can be controlled.

(2) DEHUMIDIFYING-HEATING OPERATION

In the dehumidifying-heating operation, air to be blown into the compartment is cooled and dehumidified first, and the dehumidified air is heated. Specifically, the opening degree of the decompression valve 33 for dehumidifying is reduced so that refrigerant is decompressed in the decompression valve 33. On the other hand, the three-way valve 62 is operated so that a part of refrigerant from the exterior heat exchanger 20 flows into the nozzle 41 of the ejector 40 and the other part of refrigerant from the exterior heat exchanger 20 flows into the second interior heat exchanger 32. In this state, the compressor 10 and the blower 70 are operated. Accordingly, gas refrigerant from the gas-liquid separator 50 is sucked into the compressor 10, and the compressed refrigerant is discharged from the compressor 10 into the exterior heat exchanger 20. A part of refrigerant cooled and condensed in the exterior heat exchanger 20 is decompressed in the nozzle 41 of the ejector 40 so that gas refrigerant in the first interior heat exchanger 31 is sucked into the mixing portion 42 of the ejector 40. Refrigerant sucked from the first interior heat exchanger 31 and refrigerant jetted from the nozzle 41 are mixed in the mixing portion 42, and flows into the gas-liquid separator 50 after passing through the diffuser 43. Because refrigerant in the first interior heat exchanger 31 is sucked into the ejector 40, liquid refrigerant in the gas-liquid separator 50 is supplied to the first interior heat exchanger 31, and is evaporated in the first interior heat exchanger 31 by absorbing heat from air passing through the first interior heat exchanger 31.

On the other hand, the other part of the refrigerant from the exterior heat exchanger 20 flows into the second interior heat exchanger 32 before being decompressed. Refrigerant directly flowing into the second interior heat exchanger 32 from the exterior heat exchanger 20 has a relatively high temperature and high pressure. Therefore, air cooled and dehumidified in the first interior heat exchanger 31 is heated in the second interior heat exchanger 32. Accordingly, the compartment can be dehumidified while it can prevent air to be blown into the compartment from being excessively cooled. Refrigerant flowing from the second interior heat exchanger 32 is decompressed in the decompression valve 33. Refrigerant decompressed in the decompression valve 33 and liquid refrigerant flowing from the gas-liquid separator 50 are joined, and flows into the first interior heat exchanger 31.

In the dehumidifying-heating operation, the first interior heat exchanger 31 functions as an evaporator of an ejector cycle similarly to the cooling operation, and the second interior heat exchanger 32 functions as a radiator (condenser) in an expansion cycle where the decompression valve 33 is used as an expansion valve.

When the dehumidifying-heating operation is performed in an expansion valve cycle while refrigerant bypasses the ejector 40 as in the first embodiment, consumed power in the compressor 10 is increased in the dehumidifying-heating operation. However, in the second embodiment of the present invention, a part of high-pressure refrigerant from the compressor 10 is introduced into the ejector 40, while the other part of the high-pressure refrigerant, before being decompressed, is introduced into the second interior heat exchanger 32. The refrigerant flowing out of the second interior heat exchanger 32 is further introduced into the first interior heat exchanger 31 after being decompressed in the decompression valve 33. Accordingly, even in dehumidifying-heating operation, consumed power in the compressor 10 can be reduced.

In the above-described first embodiment, in the cooling operation, because both of liquid refrigerant and gas refrigerant evaporated in the first interior heat exchanger 31 flows through the decompression valve 33 and the second interior heat exchanger 32, the following problems may be caused in the cooling operation. For example, when the second interior heat exchanger 32 is a multi-type heat exchanger having plural tubes, it is difficult to flow refrigerant into the plural tubes uniformly because gas refrigerant density is greatly different from the liquid refrigerant density. On the other hand, when gas-liquid two-phase refrigerant flows into the decompression valve 33, pressure loss generated in the decompression valve 33 is increased as compared with a case where only liquid refrigerant flows through the decompression valve 33. Therefore, it is need to increase the inner space of the decompression valve 33 for removing this problem. However, in the second embodiment, in the cooling operation, only liquid refrigerant from the gas-liquid separator 50 is supplied to the first interior heat exchanger 31, and the second interior heat exchanger 32 through the decompression valve 33 without being decompressed in the decompression valve 33. Accordingly, in the second embodiment, the above-described problem is not caused in theory.

In the second embodiment of the present invention, in the dehumidifying-heating operation, refrigerant decompressed in the decompression valve 33 flows into the first interior heat exchanger 31. Therefore, gas-liquid two-phase refrigerant may flow into the first interior heat exchanger 31 in the dehumidifying-heating operation. However, dehumidifying capacity necessary in the first interior heat exchanger 31 is small, a necessary heat-exchanging performance can be readily obtained in the first interior heat exchanger.

Accordingly, in the second embodiment, the compartment can be effectively dehumidified while it can prevent air to be blown into the compartment from being excessively cooled. Even in the dehumidifying-heating operation, the rotation speed of the compressor 10, the opening degree of the decompression valve 33 and the air blowing amount of the blower 70 are controlled by the electronic control unit, so that the temperature of air blown into the compartment can be controlled.

Figure 6:
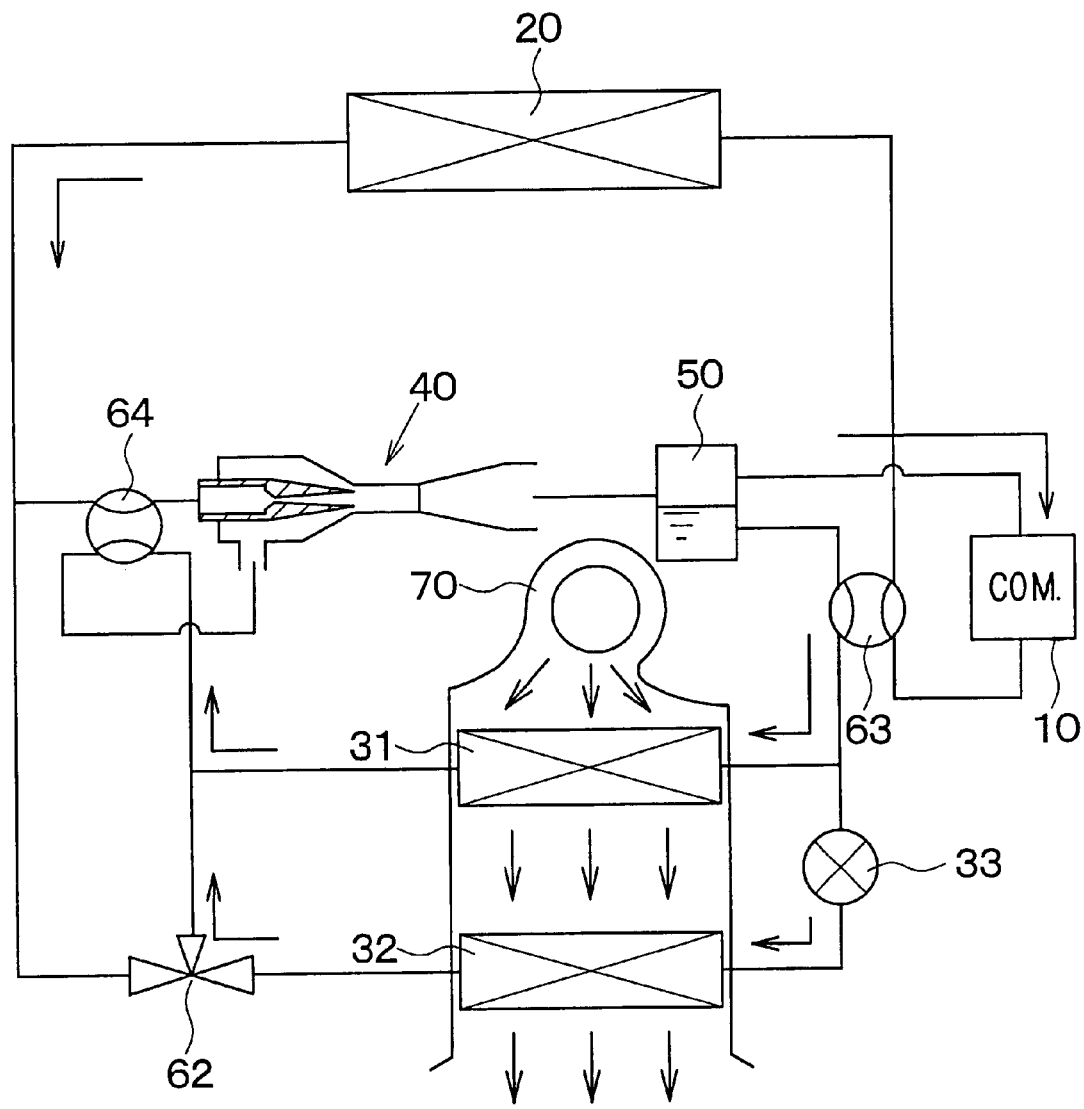
FIG. 6 is a schematic diagram showing a refrigerant flow in a refrigerant cycle of an air conditioner, in a cooling operation, according to a third preferred embodiment of the present invention.
Figure 7:
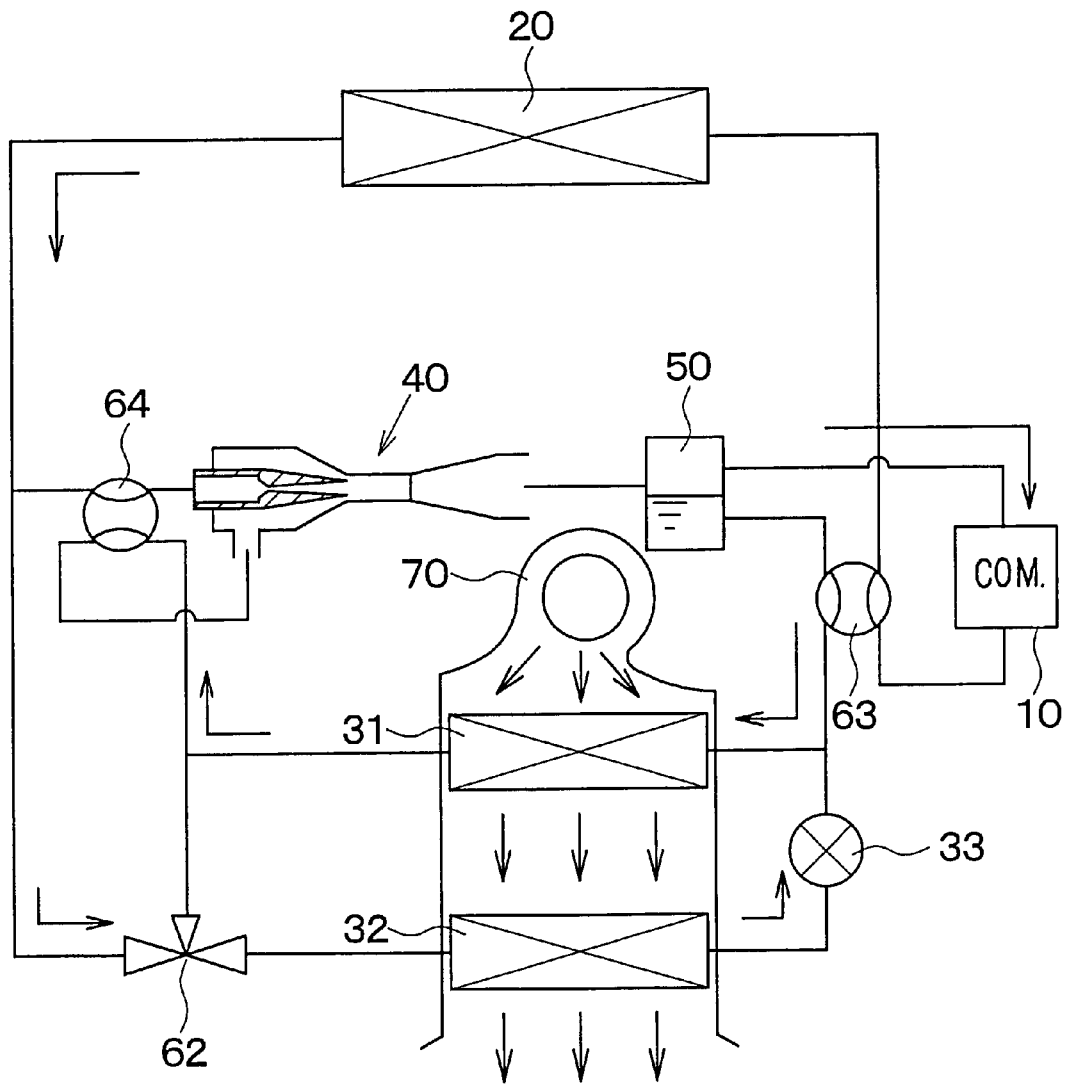
FIG. 7 is a schematic diagram showing a refrigerant flow of the refrigerant cycle of the air conditioner in a dehumidifying-heating operation, according to the third embodiment.
Figure 8:
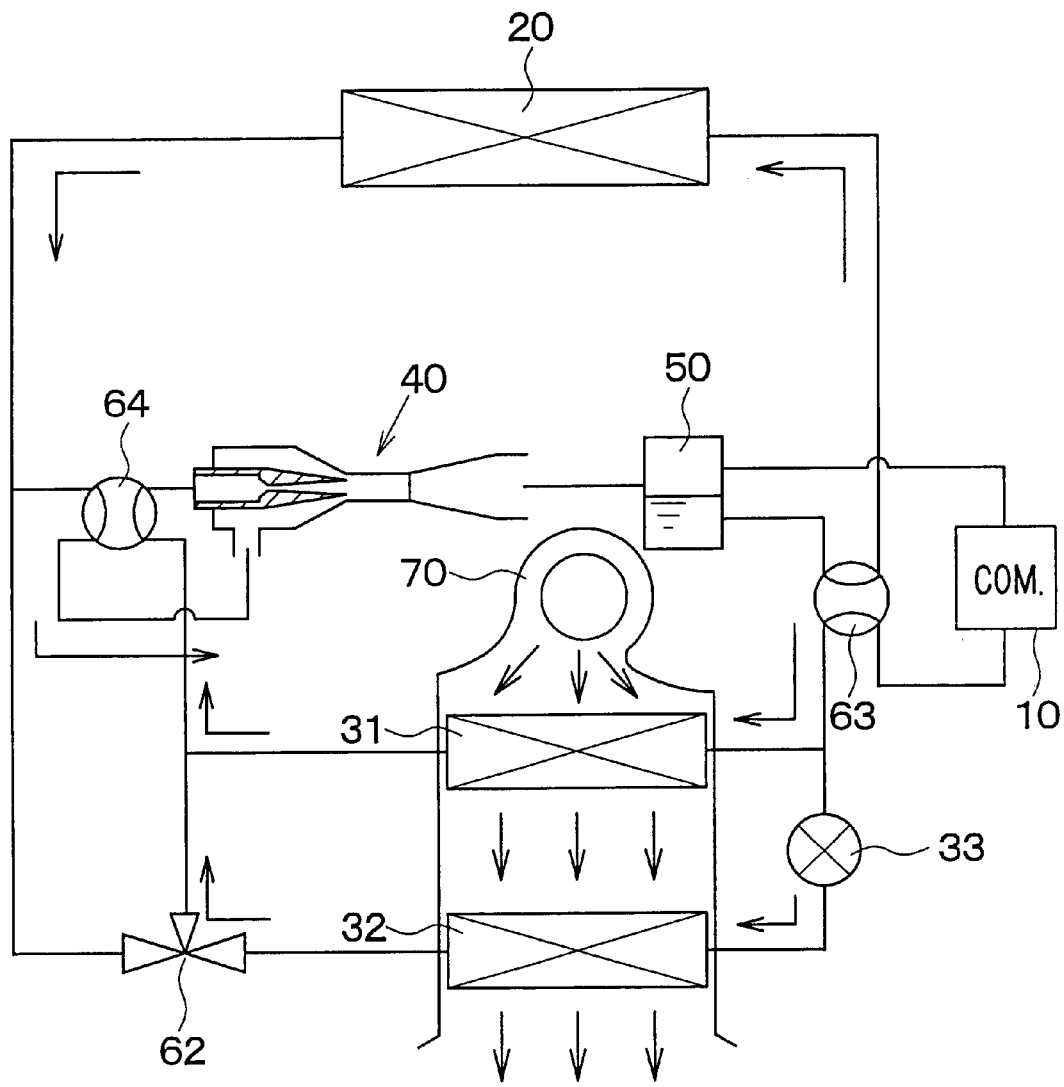
FIG. 8 is a schematic diagram showing a refrigerant flow of the refrigerant cycle of the air conditioner in a heating operation, according to the third embodiment.

A third preferred embodiment of the present invention will be now described with reference to FIGS. 6–8. The third embodiment is a modification of the above-described second embodiment. In the third embodiment, similarly to the second embodiment, the first interior heat exchanger 31 and the second interior heat exchanger 32 are arranged in parallel, relative to the refrigerant flow in the cooling operation. As shown in FIGS. 6–8, switching valves 63, 64 are additionally provided so that refrigerant discharged from the compressor 10 is switched to flow to the exterior heat exchanger 20 or to the first and second interior heat exchangers 31, 32. Accordingly, by the switching operations of the switching valves 62-64, one of the cooling operation, the dehumidifying-heating operation and a heating operation can be selected.

FIG. 6 shows a refrigerant flow in the cooling operation of the third embodiment. In the cooling operation, the switching valves 62-64 are operated so that refrigerant flows similarly to that in the cooling operation of the second embodiment. FIG. 7 shows a refrigerant flow in the dehumidifying-heating operation of the third embodiment. In the dehumidifying-heating operation, the switching valves 62-64 are operated so that refrigerant flows similarly to that in the dehumidifying-heating operation of the second embodiment.

FIG. 8 shows a refrigerant flow in the heating operation of the third embodiment. In the heating operation, the decompression valve 33 for dehumidifying is fully opened. In the heating operation, gas refrigerant is sucked into the compressor 10 from the gas-liquid separator 50 to be compressed in the compressor 10. Gas refrigerant compressed in the compressor 10 is discharged to the first and second interior heat exchangers 31, 32, so that air passing through the first and second interior heat exchangers 31, 32 is heated. Therefore, refrigerant is cooled and condensed in the first and second interior heat exchangers 31, 32 and is decompressed in the nozzle 41 of the ejector 40, while refrigerant in the exterior heat exchanger 20 is sucked into the mixing portion 42 of the ejector 40. Refrigerant flowing into the nozzle 41 from the first and second interior heat exchangers 31, 32 and refrigerant sucked into the ejector 40 from the exterior heat exchanger 20 are mixed in the mixing portion 42 of the ejector 40, and the dynamic pressure of the refrigerant is changed to the static pressure thereof in the diffuser 43 of the ejector 40. Thereafter, refrigerant from the ejector 40 returns to the gas-liquid separator 50.

Because refrigerant in the exterior heat exchanger 20 is sucked to the ejector 40, liquid refrigerant in the gas-liquid separator 50 is supplied to the exterior heat exchanger 20, and is evaporated in the exterior heat exchanger 20 by absorbing heat from outside air.

Accordingly, in the third embodiment, the heating operation can be performed in addition to the cooling operation and the dehumidifying-heating operation. The heating operation described in the third embodiment can be performed in the above-described first embodiment.

Although the present invention has been fully described in connection with the preferred embodiments thereof with reference to the accompanying drawings, it is to be noted that various changes and modifications will become apparent to those skilled in the art.

For example, the air conditioner according to the present invention can be used for a vehicle or the other compartment. Further, in the above-described embodiments, a general refrigerant such as fluorocarbon (flon) is used. However, carbon dioxide or hydrocarbon can be also used as the refrigerant. In this case, the pressure of refrigerant at the high-pressure side becomes equal to or higher than the critical pressure of the refrigerant. Therefore, the effect of the ejector cycle system can be further improved.

Such changes and modifications are to be understood as being within the scope of the present invention as defined by the appended claims.

What is claimed is:

1. An air conditioner for a compartment, comprising:

a compressor for sucking and compressing refrigerant;

an exterior heat exchanger for performing heat-exchange between the refrigerant and air outside the compartment;

a first interior heat exchanger for performing heat-exchange between the refrigerant and air to be blown into the compartment;

a second interior heat exchanger for performing heat-exchange between the refrigerant and air to be blown into the compartment, the second interior heat exchanger being disposed at a downstream air side of the first interior heat exchanger;

an ejector including a nozzle for converting pressure energy of high-pressure side refrigerant to a speed energy so that the high-pressure side refrigerant is decompressed and expanded, and a pressure-increasing portion in which the speed energy is converted to the pressure energy so that the pressure of refrigerant is increased while refrigerant discharged from the nozzle and gas refrigerant sucked from a low pressure side are mixed;

a gas-liquid separator for separating refrigerant into gas refrigerant and liquid refrigerant, the gas-liquid separator being coupled to the compressor such that gas refrigerant is sucked into the compressor;

a switching unit for switching one of at least a cooling operation for cooling the compartment and a dehumidifying-heating operation for dehumidifying the compartment while restricting a temperature decrease in the compartment; and a decompression unit for decompressing refrigerant at least in the dehumidifying-heating operation, the decompression unit being disposed in a refrigerant passage connecting the first interior heat exchanger and the second interior heat exchanger; wherein:

in the cooling operation, refrigerant in the first and second interior heat exchangers is evaporated, and refrigerant in the exterior heat exchanger is radiated;

in the dehumidifying-heating operation, refrigerant is evaporated in the first interior heat exchanger while refrigerant in the second interior heat exchanger is radiated;

the first interior heat exchanger and the second interior heat exchanger are arranged in series, relative to a refrigerant flow;

in the cooling operation, refrigerant discharged from the compressor flows through the exterior heat exchanger, the nozzle of the ejector and the gas-liquid separator in this order, while liquid refrigerant in the gas-liquid separator flows through the first and second interior heat exchangers, the ejector and the gas-liquid separator in this order; and in the dehumidifying-heating operation, refrigerant discharged from the compressor flows through the exterior heat exchanger, the second interior heat exchanger, the decompression unit, the first interior heat exchanger and the gas-liquid separator in this order while bypassing the ejector.

2. An air conditioner for a compartment, comprising:

a compressor for sucking and compressing refrigerant;

an exterior heat exchanger for performing heat-exchange between the refrigerant and air outside the compartment;

a first interior heat exchanger for performing heat-exchange between the refrigerant and air to be blown into the compartment;

a second interior heat exchanger for performing heat-exchange between the refrigerant and air to be blown into the compartment, the second interior heat exchanger being disposed at a downstream air side of the first interior heat exchanger;

an ejector including a nozzle for converting pressure energy of high-pressure side refrigerant to a speed energy so that the high-pressure side refrigerant is decompressed and expanded, and a pressure-increasing portion in which the speed energy is converted to the pressure energy so that the pressure of refrigerant is increased while refrigerant discharged from the nozzle and gas refrigerant sucked from a low pressure side are mixed;

a gas-liquid separator for separating refrigerant into gas refrigerant and liquid refrigerant, the gas-liquid separator being coupled to the compressor such that gas refrigerant is sucked into the compressor;

a switching unit for switching one of at least a cooling operation for cooling the compartment and a dehumidifying-heating operation for dehumidifying the compartment while restricting a temperature decrease in the compartment; and a decompression unit for decompressing refrigerant at least in the dehumidifying-heating operation, the decompression unit being disposed in a refrigerant passage connecting the first interior heat exchanger and the second interior heat exchanger; wherein:

in the cooling operation, refrigerant in the first and second interior heat exchangers is evaporated, and refrigerant in the exterior heat exchanger is radiated;

in the dehumidifying-heating operation, refrigerant is evaporated in the first interior heat exchanger while refrigerant in the second interior heat exchanger is radiated;

the first interior heat exchanger and the second interior heat exchanger are arranged in parallel relative to a refrigerant flow, at least in the cooling operation; and at least in the dehumidifying-heating operation, a part of high-pressure refrigerant discharged from the compressor, before being decompressed, is introduced into the second interior heat exchanger, and flows into the first interior heat exchanger after being decompressed in the decompression unit, while the other part of the high-pressure refrigerant is introduced into the nozzle of the ejector.

3. An air conditioner for a compartment, comprising:

a compressor for sucking and compressing refrigerant;

an exterior heat exchanger for performing heat-exchange between the refrigerant and air outside the compartment;

a first interior heat exchanger for performing heat-exchange between the refrigerant and air to be blown into the compartment;

a second interior heat exchanger for performing heat-exchange between the refrigerant and air to be blown into the compartment, the second interior heat exchanger being disposed at a downstream air side of the first interior heat exchanger;

an ejector including a nozzle for converting pressure energy of high-pressure side refrigerant to a speed energy so that the high-pressure side refrigerant is decompressed and expanded, and a pressure-increasing portion in which the speed energy is converted to the pressure energy so that the pressure of refrigerant is increased while refrigerant discharged from the nozzle and gas refrigerant sucked from a low pressure side are mixed;

a gas-liquid separator for separating refrigerant into gas refrigerant and liquid refrigerant, the gas-liquid separator being coupled to the compressor such that gas refrigerant is sucked into the compressor; and a switching unit for switching one of at least a cooling operation for cooling the compartment and a dehumidifying-heating operation for dehumidifying the compartment while restricting a temperature decrease in the compartment; wherein:

in the cooling operation, refrigerant in the first and second interior heat exchangers is evaporated, and refrigerant in the exterior heat exchanger is radiated;

in the dehumidifying-heating operation, refrigerant is evaporated in the first interior heat exchanger while refrigerant in the second interior heat exchanger is radiated;

the switching unit is disposed to switch one of the cooling operation, the dehumidifying-heating operation, and a heating operation for heating the compartment; and in the heating operation, refrigerant is evaporated in the exterior heat exchanger while refrigerant is radiated in both the first and second interior heat exchangers.

4. The air conditioner according to claim 3, wherein:

in the heating operation, refrigerant discharged from the compressor flows through the first and second interior heat exchangers, the nozzle of the ejector and the gas-liquid separator, while liquid refrigerant in the gas-liquid separator flows through the exterior heat exchanger, the ejector and the gas-liquid separator in this order.

5. The air conditioner according to claim 4, wherein the first interior heat exchanger and the second interior heat exchanger are arranged in parallel, relative to a refrigerant flow in the heating operation.

6. The air conditioner according to claim 4, wherein the first interior heat exchanger and the second interior heat exchanger are arranged in series, relative to a refrigerant flow in the heating operation.

7. The air conditioner according to claim 1, wherein:

the switching unit is disposed to switch one of a first mode where refrigerant discharged from the compressor flows toward the exterior heat exchanger, and a second mode where refrigerant discharged from the compressor flows toward the first and second interior heat exchangers.

8. The air conditioner according to claim 1, wherein:

one of carbon dioxide, fluorocarbon and hydrocarbon is used as the refrigerant.

9. The air conditioner according to claim 2, wherein:

the switching unit is disposed to switch one of a first mode where refrigerant discharged from the compressor flows toward the exterior heat exchanger, and a second mode where refrigerant discharged from the compressor flows toward the first and second interior heat exchangers.

10. The air conditioner according to claim 2, wherein:

one of carbon dioxide, fluorocarbon and hydrocarbon is used as the refrigerant.

11. The air conditioner according to claim 3, wherein:

the switching unit is disposed to switch one of a first mode where refrigerant discharged from the compressor flows toward the exterior heat exchanger, and a second mode where refrigerant discharged from the compressor flows toward the first and second interior heat exchangers.

12. The air conditioner according to claim 3, wherein:

one of carbon dioxide, fluorocarbon and hydrocarbon is used as the refrigerant.

* * * * *